(12) United States Patent
Drin

(10) Patent No.: US 6,338,247 B1
(45) Date of Patent: Jan. 15, 2002

(54) SYSTEM FOR CONTROLLING A HYDRAULIC VEHICLE DRIVE

(75) Inventor: Bernard Drin, Livry-sur-Seine (FR)

(73) Assignee: Sauer-Danfoss Inc., Ames, IA (US)

( * ) Notice: Subject to any disclaimer, the term of this patent is extended or adjusted under 35 U.S.C. 154(b) by 0 days.

(21) Appl. No.: 09/443,693

(22) Filed: Nov. 19, 1999

(30) Foreign Application Priority Data

Nov. 20, 1998 (DE) .......................................... 198 53 679
Jul. 5, 1999 (DE) .......................................... 199 30 997

(51) Int. Cl.[7] .............................................. F16D 31/02
(52) U.S. Cl. ............................. 60/466; 60/489; 60/494
(58) Field of Search ......................... 60/460, 466, 487, 60/489, 494

(56) References Cited

U.S. PATENT DOCUMENTS

| | | | | |
|---|---|---|---|---|
| 3,175,354 A | * | 3/1965 | Firth et al. ................. | 60/466 X |
| 4,736,585 A | * | 4/1988 | Kordak ....................... | 60/459 X |
| RE33,131 E | * | 12/1989 | Morrison ................ | 180/19.1 X |
| 5,048,295 A | * | 9/1991 | Hoscheler ................. | 60/466 X |
| 5,062,266 A | * | 11/1991 | Yoshimatsu ................... | 60/466 |
| 5,167,291 A | * | 12/1992 | Mann ........................ | 60/466 X |
| 5,191,826 A | * | 3/1993 | Brunner ..................... | 60/466 X |
| 5,197,284 A | * | 3/1993 | Cartner ........................ | 60/466 |

* cited by examiner

*Primary Examiner*—John E. Ryznic
(74) *Attorney, Agent, or Firm*—Zarley, McKee, Thomte, Voorhees & Sease PLC

(57) ABSTRACT

A hydraulic vehicle drive, having a closed hydraulic circuit consists of a variable displacement pump and one or several hydraulic motors. The variable displacement pump is driven by a diesel engine. During the braking or pushing operation of the vehicle, the hydraulic motor becomes a pump and drives the variable displacement pump which, in turn, acts as a motor upon the diesel engine and acts to accelerate the latter. Thus, the intended braking effect prevents the danger that the diesel engine will reach non-permissible high revolutions per unit time, which is particularly dangerous for diesel engines with turbochargers. In order to prevent non-permissible high revolutions per unit time, a pressure regulator acting as a throttle is placed in the return line between the hydraulic motor and the variable displacement pump. The valve throttles the rate of flow when the pressure of the hydraulic fluid in the line exceeds a certain desired value during the braking operation. In this way, a pressure at the variable displacement pump that is too high is prevented and the diesel engine does not enter the realm of dangerous revolutions per unit time.

11 Claims, 1 Drawing Sheet

SYSTEM FOR CONTROLLING A HYDRAULIC VEHICLE DRIVE

BACKGROUND OF THE INVENTION

Mobile work vehicles are currently equipped with diesel engines and hydrostatic traction. The diesel engines are increasingly being provided with turbochargers which effect a fundamental power increase, but at the same time do not allow the same permissible drag power in drag operation. The design of a hydrostatic transmission is basically known. Work vehicles can be fitted both with one and with a plurality of hydraulic motors, depending on the installed drive power and the requirements placed on maximum traction force and maximum driving speed.

The vehicle fitted with hydrostatic transmission has the advantage that the hydrostatic traction can also act as a brake. This is performed by reducing the pump tilt angle in conjunction with unchanged driving speed. In that instance, the flow of power from the pump to the motor/motors is reversed, and the motors work as a pump. The variable-delivery pump becomes the motor. The energy of the vehicle from mass and speed now drives the units previously designated as hydraulic motors. These units supply volumetric flow to the variable delivery pump. The variable-delivery pump builds up hydraulic resistance, as a result of which the operating pressure (brake pressure) increases. The product of brake pressure x pump swept volume yields a torque which drives the diesel engine in drag operation or in overrun condition at the diesel engine. With very large vehicles, the drag torque to be supported can become so large that the diesel engine substantially overshoots its rated speed, resulting in possible damage. Damage to the remaining components, and loss of hydrostatic braking capacity can result.

It is therefore a principal object of this invention to provide a brake circuit for a mobile work vehicle having a hydrostatic traction system including a closed hydraulic circuit having a variable delivery pump and at least one hydraulic motor, wherein a pressure-limiting valve is in the brake circuit for converting energy from braking energy into heat.

A further object of the invention is to provide a system for controlling a hydraulic vehicle drive in such a way that the possibilities of the hydraulic braking are used to the fullest extent, but non-permissible high revolutions per unit time of the diesel engine driving the variable displacement pump are prevented.

These and other objects will be apparent to those skilled in the art.

SUMMARY OF THE INVENTION

A pressure-limiting valve is located in a closed hydraulic circuit of a mobile vehicle having a traction system which includes the brake circuit. The brake circuit also includes a variable-delivery pump and at least one hydraulic motor. The pressure limiting valve is in the brake circuit to convert braking energy into heat. More specifically, this invention is achieved by arranging in one of the lines a pressure regulator that acts as a throttle and that is activated in the presence of an increase in pressure of the liquid flowing from the hydraulic motor to the variable displacement pump. With such an arrangement, as usual, the hydraulic fluid flows at first through the one line, under a higher pressure, toward the hydraulic motor and through the other line, under a lower pressure, back toward the variable displacement pump. However, if the vehicle starts a braking operation, the hydraulic fluid will maintain its direction of flow, but the hydraulic motor now acts as a pump. For this reason, the pressure in the return line rises to a higher value. As soon as it reaches a value which might cause non-permissible high revolutions per unit time of the variable displacement pump and thus of the diesel engine, the pressure regulator of the invention is activated. While the regulator was completely open during normal operation, upon responding to the increase in pressure of the hydraulic fluid returning from the hydraulic motor, the regulator acts as a flow throttle, for example, in the form of a shield. At that point, a specific energy conversion of flow energy into heat takes place and the braking energy is reduced appropriately. The arrangement of the invention can be fine-tuned in such a way that a maximum hydraulic braking action is combined with revolutions per unit time which are not dangerous to the diesel engine.

In practice, the vehicles are designed for high transfer speeds, i.e., for fast driving in the forward direction. Thus, they can drive faster in the forward direction than in the reverse direction. The indicated problems occur specifically during braking while driving at fast speeds in the forward direction. For this reason, the arrangement of the invention is important particularly when it becomes effective while driving in the forward direction.

In accordance with a first refinement, however, it is also possible to provide a pressure regulator in each of the two lines so that the arrangement of the invention finds application during forward and reverse driving.

The pressure regulator, which is arranged in the line, provides flow resistance when the hydraulic fluid flows through this line in the opposite direction, i.e., the line serves as a supply line for the hydraulic motor. In order to eliminate this disadvantage, in accordance with a further development, a return valve is provided parallel to the pressure regulator and which opens in the direction of supply of hydraulic fluid to the hydraulic motor. Thus, in case of driving in the opposite direction, the supply of hydraulic fluid to the hydraulic motor can take place despite the presence of the pressure regulator without additional flow resistances.

The drive of the pressure regulator is possible in all known ways, for example, electrically or hydraulically.

In accordance with an advantageous refinement of the invention, by skillfully fine-tuning the entire arrangement, a certain operating pressure of the hydraulic fluid in the closed cycle can be built up at the variable displacement pump which deviates from the operating pressure at the hydraulic motor. This operating pressure is then available to the vehicle as an exactly defined braking pressure.

DESCRIPTION OF THE PREFERRED EMBODIMENT

Figure 1:
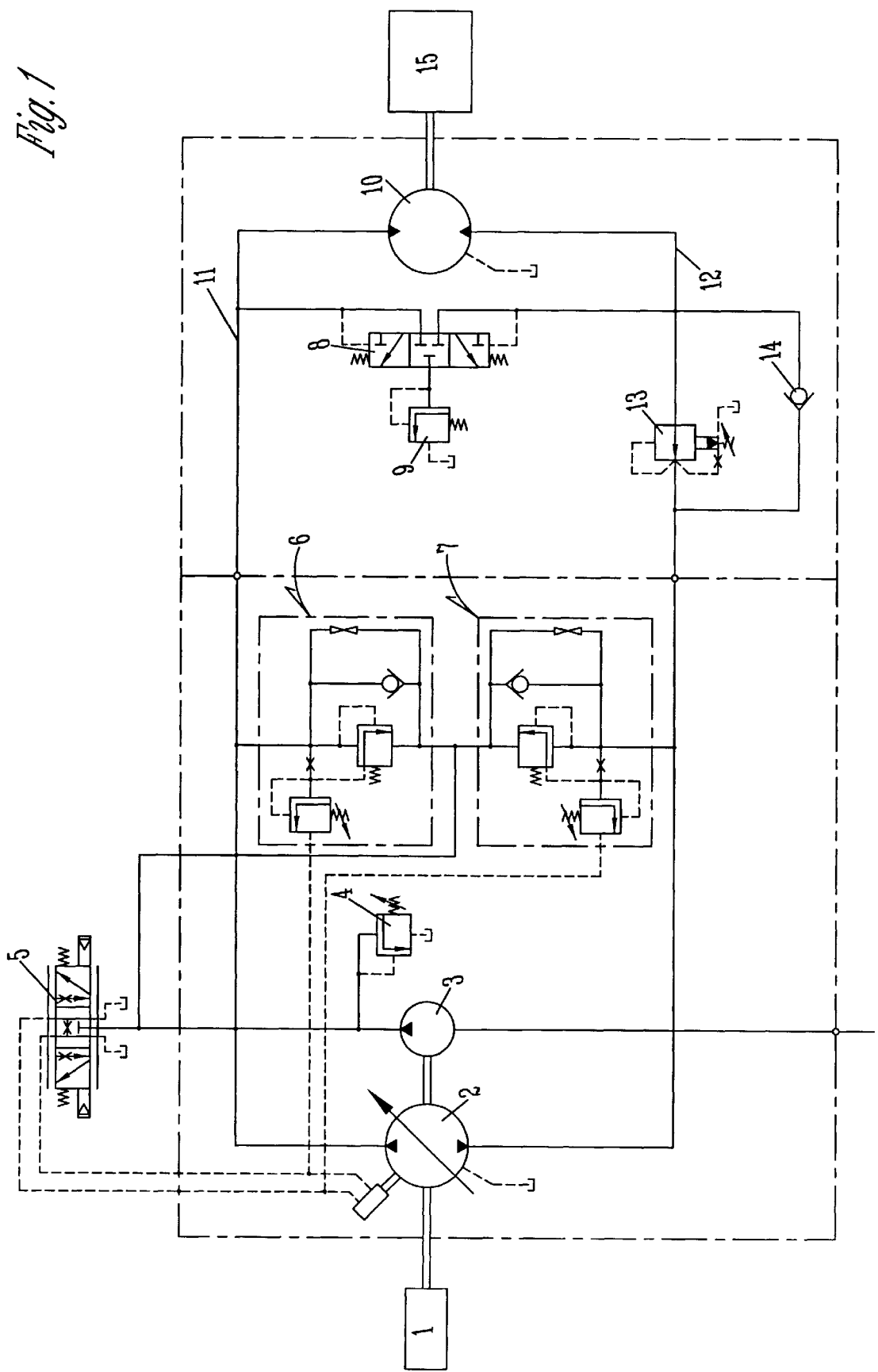
FIG. 1 is a schematic view of the hydraulic circuitry of the invention.

In order to prevent the braking torque or drag torque rising to an impermissible degree at the diesel engine, a restriction (reduction in pressure) is carried out by means of a valve in the high-pressure circuit on the side in which a braking pressure is built up by the valve during overrunning. The product of the volumetric flow and pressure yields a power which is converted into heat. The remaining residual pressure—multiplied by the pump displacement—may not exceed the maximum permissible support torque of the diesel engine.

It is possible in this way to utilize the existing braking torque of the diesel engine without causing the appearance of impermissible racing of the diesel engine. This results in two power components for the retardation of the vehicle: Support pressure×pump displacement×pump speed+ displacement of the hydraulic motors in overrunning× operating pressure at the motors reduced by the braking pressure at the hydraulic pump. This feature is reflected in the following equation:

$$P=(P_{sx} \times Vp \times np + Q_M)(P_{motor} - P_{st})$$

Wherein

P=Power components for retardation of the vehicle.

$P_{sx}$=Support pressure.

Vp=Pump displacement.

np=Pump speed.

$Q_M$=Displacement of the hydraulic motors in overrunning conditions.

$P_{motor}$=Operating pressure at the motors.

$P_{st}$=Braking pressure at the hydraulic pump.

A higher braking power is thereby possible overall without allowing a permissible acceleration of the diesel engine. The built-in pressure-limiting valve can be a hydraulically or electrically pilot-operated-limiting valve. A non-return valve is inserted in parallel therewith for the reverse direction of oil flow, in order to ensure flow losses which are as slight as possible in traction operation.

With reference to FIG. 1, a diesel motor 1 drives a variable displacement pump 2 and a feed pump 3. 4 refers to a supply-pressure relief valve and 5 refers to the servo-adjustment for the pivoting angle of the variable displacement pump 2. Supply-pressure and high-pressure relief valves 6 and 7 supply the drive and its control with hydraulic fluid at the required amount of pressure. A shuttle valve 8 and a pressure relief valve 9 serving as a flushing gate enable the flushing process in the closed hydraulic circuit. From the variable displacement pump 2, a line 11 leads to the hydraulic motor 10; the hydraulic fluid used there flows via the line 12 back to the variable displacement pump 2. During forward driving, for example, the line 11 is the supply line under pressure to the hydraulic motor 10, while the line 12 serves as a return line and is under lower pressure. During reverse driving, the situation is reversed; the line 12 is then under high pressure and the line 11 is under low pressure. A pressure regulator of the throttle type is built in the line 12 and it is activated when the pressure in the line 12 reaches a certain desired value. Parallel to the pressure regulator 13 is return valve 14. The latter is such that it blocks the return flow of hydraulic fluid from the hydraulic motor to the variable displacement pump 2, but opens when—during driving in the opposite direction—the hydraulic fluid flows from the variable displacement pump 2 through the line 12 to the hydraulic motor 10. The drive shaft of the hydraulic motor 10 affects the gears 15 which, in turn, puts the drive gears of the vehicle into a rotating motion.

In operation, as long as the vehicle is driven so that it moves in the forward direction, hydraulic fluid flows from the variable displacement pump 2 through the line 11 to the hydraulic motor 10. The latter drives the drive gears of the vehicle via the gears 15 and the hydraulic fluid flows through the line 12, via the pressure regulator 13, which is completely open, back to the variable displacement pump 2. If the vehicle moves into the braking or pushing mode, then the output of the variable displacement pump 2 is reduced to zero due to a reduction of the pivoting angle of the pump. Due to mass moment of inertia, the vehicle is in the pushing mode and drives the hydraulic motor 10 to turn via the drive gears and the gear 15 so that the hydraulic motor now becomes a hydraulic pump. If the direction of flow of the hydraulic fluid is not changed, a higher pressure is now built up in the line 12 and at the variable displacement pump 2. As soon as the pressure in the line 12 reaches a predetermined value, the pressure regulator 13 is activated as a throttle valve; thereby the pressure in the line 12 is limited to a certain maximum and flow energy is converted into heat. The pressure of the hydraulic fluid directed to the variable displacement pump is thereby limited to a value which does not allow the accelerated moment transferred from the variable displacement pump to the diesel engine to become too strong. The diesel engine 1 thus contributes to the braking process of the vehicle but does not reach dangerous revolutions per unit time. During the braking operation, the return valve 14 prevents hydraulic fluid from flowing past the pressure regulator 13 back to the variable displacement pump 2.

However, if the direction of driving of the vehicle is reversed, then the line 12 serves as a supply line which directs hydraulic fluid from the variable displacement pump 2 to the hydraulic motor 10. Under the pressure of the inflowing hydraulic fluid, the return valve 14 opens and the hydraulic fluid can flow to the hydraulic motor 10 in a manner undisturbed by structurally dependent flow resistances of even the open pressure regulator. For a pressure regulator in the line 11, the processes take place accordingly.

It is therefore seen that this invention will achieve at least its stated objectives.

I claim:

1. A mobile work vehicle comprising:

a hydrostatic traction system including a closed brake circuit having a variable-delivery pump and at least one hydraulic motor;

a normally open pressure-limiting valve in the brake circuit for converting energy from braking energy into heat; and a non-return hydraulic valve in the brake circuit hydraulically in parallel with the pressure-limiting valve.

2. The work vehicle of claim 1 wherein the pressure-limiting valve is electrically driven.

3. The work vehicle of claim 2 wherein the pressure-limiting valve builds up braking pressure proportional to a hydraulically control pressure that drives the valve.

4. The work vehicle of claim 1 wherein the pressure-limiting valve is hydraulically driven.

5. The work vehicle of claim 1 wherein the traction system includes a diesel engine operatively connected to the brake circuit and wherein the engine is capable of providing braking torque without increasing the operating speed thereof in accordance with the equation:

$$P=(P_{sx} \times Vp \times np + Q_M)(P_{motor} - Pst);$$

wherein

P=Power components for retardation of the vehicle;

$P_{sx}$=Support pressure;

Vp=Pump displacement;

np=Pump speed;

$Q_M$=Displacement of the hydraulic motors in overrunning conditions;

$P_{motor}$=Operating pressure at the motors;

$P_{st}$=Braking pressure at the hydraulic pump.

6. The work vehicle of claim 1 wherein the pressure-limiting valve has a single pilot pressure line connected thereto for urging the pressure-limiting valve closed in response to braking pressure.

7. A system for controlling a hydraulic vehicle drive with a closed hydraulic circuit having a variable displacement pump driven by a diesel engine, a hydraulic motor driving drive gears of the vehicle and two lines for hydraulic fluid connecting the variable displacement pump and the hydraulic motor, wherein each of the lines depending on the driving direction of the vehicle can be a forward line or a return line for the hydraulic motor, comprising:

a normally open pressure regulator in one of the lines to be activated when the pressure of the hydraulic fluid flowing from the hydraulic motor to the variable displacement pump is increased; and a non-return valve that opens in the direction of supply of hydraulic fluid to the hydraulic motor, the non-return valve being connected in parallel to the pressure regulator.

8. The system of claim 7 wherein a pressure regulator is provided in each line, respectively.

9. The system of claim 7 wherein the pressure regulator is driven electrically.

10. The system of claim 7 wherein the pressure regulator is driven hydraulically.

11. The system of claim 7 wherein the pressure regulator is adapted to receive a single pilot pressure signal for urging the pressure regulator to close.

* * * * *